(No Model.)
J. W. CHAMBERLAIN.
FLOAT VALVE.
No. 551,577. Patented Dec. 17, 1895.
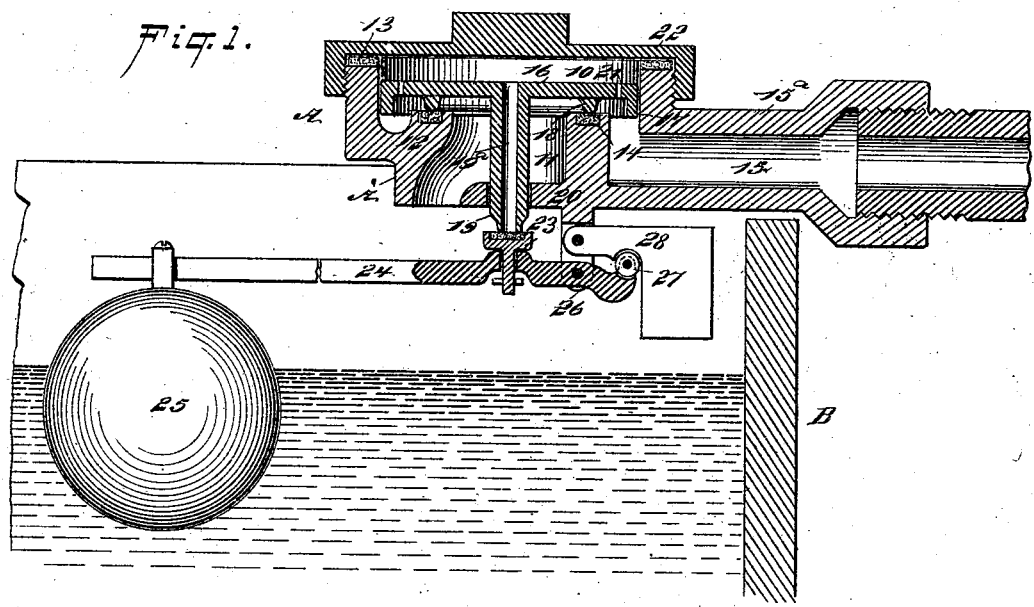
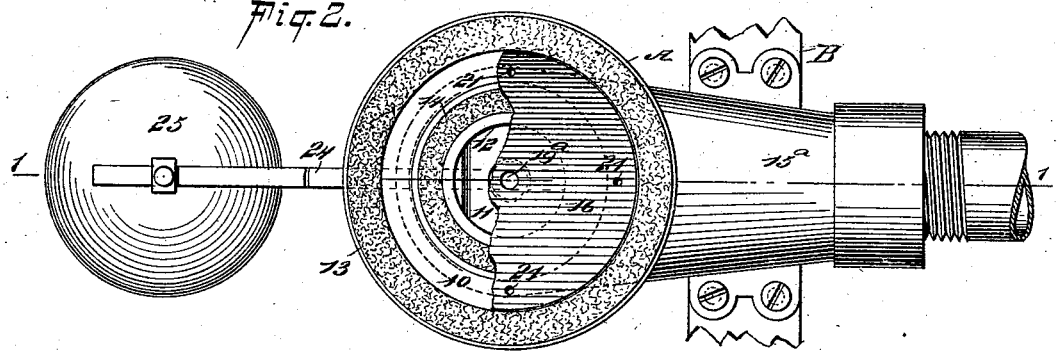
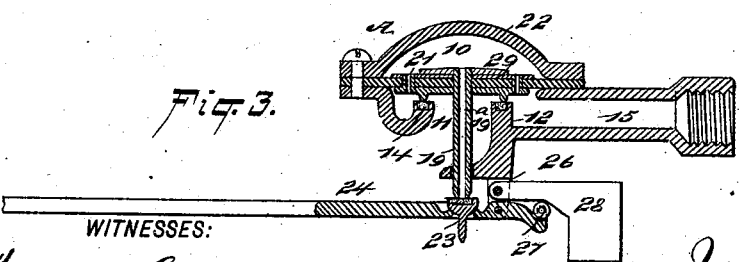
WITNESSES:
William Goebel
J. Fred Acker
INVENTOR
J. W. Chamberlain
BY
Munn & Co
ATTORNEYS.

UNITED STATES PATENT OFFICE.

JOSEPH W. CHAMBERLAIN, OF BANGOR, MAINE, ASSIGNOR TO THE J. W. CHAMBERLAIN COMPANY, OF SAME PLACE.

FLOAT-VALVE.

SPECIFICATION forming part of Letters Patent No. 551,577, dated December 17, 1895.

Application filed October 18, 1894. Serial No. 526,278. (No model.)

*To all whom it may concern:*

Be it known that I, JOSEPH W. CHAMBERLAIN, of Bangor, in the county of Penobscot and State of Maine, have invented a new and Improved Float-Valve, of which the following is a full, clear, and exact description.

My invention relates to an improvement in float-valves or ball-cocks, and it has for its object to so construct a valve that it will open and close a full water-way instantly, affording a flow of water as large as the pipe supplying the valve will discharge, and to construct such a valve in a simple and economic manner.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a vertical longitudinal section through the valve and through a portion of a tank to which it is applied. Fig. 2 is a plan view of the valve with the cap removed and the disk cut-off partly broken away, and Fig. 3 is a longitudinal vertical section through a valve in which a modified form of cut-off is illustrated.

Ordinary float-valves open a very small passage for the water if a small amount of water is drawn from the tank, and not until a large amount of water has been drawn and the float has fallen four or five inches, for example, or even more, is there a full water-way opened. In the event a bucket or two of water is drawn at the kitchen sink, or a basin full is drawn in the bath-room, the water in the tank falls just enough, under the ordinary construction, to open a very small water-way, and through which the water will comparatively drip for an hour or so before the tank will be again refilled, and the same is true in closing after a full water-way has been opened. As the water fills the tank the float closes the valve slowly, allowing a smaller and ever-growing smaller quantity of water to flow through the valve, until another hour or so of dripping has completely filled the tank and closed the valve. In fact, a small dribbling stream is the usual amount of water furnished an ordinary household through the ordinary slow-closing ball-cocks in common use, for unless a large quantity of water is drawn from the tank at once the float seldom falls sufficiently to open a full water-way. Furthermore, in the event of leakage in any of the faucets in the house, the valve shows a corresponding leakage or dripping into the tank. The float shutting the valve against the pressure feels the slightest loss of supporting power in the water. Under high pressure the float is often too small, and the rod connecting it with the valve too short to give sufficient leverage to close the valve tightly at all times when the tank is full, and waste of water through the overflow and wear of the valve-seat and washer by the friction of the escaping water are among the damaging results. The constant small stream forced with great pressure through the nearly-closed valve in all these cases wears out the parts against which the water flows very quickly, and a valve which should last years is worn out in a few months.

In order that a valve should be durable and free from the annoyance of constant dribbling, the valve should be constructed so as to open a full water-way instantly, and to tightly close it as quickly as it opens. This is the prime object of the present invention.

In carrying out the invention the improved valve A is illustrated as mounted upon a tank B. The body A' of the valve is formed with an interior chamber 10, and the said chamber is provided with an outlet 11 at or near its center, surrounded by a partition 12, preferably of annular formation. Upon the upper edge or face of the body a washer 13 is placed of any approved character, a like washer 14 being introduced into or laid upon the top of the partition 12, while the inlet 15 of the said chamber is through an extension 15ᵃ from one of its sides to be coupled with the water-supply pipe, the said inlet leading into the chamber at one side of its central partition 12. The supply of water from the inlet to the outlet is normally closed through the medium of a disk 16, which serves as a cut-off, the disk being of sufficient size to engage with the wall of the said chamber above the top of the partition 12 surrounding the outlet, and this disk is preferably provided with a downwardly-extending marginal flange 17, and a seat 18 upon its under face to engage with or rest upon the washer 14. The disk is furthermore provided with a spindle 19, pendent from its under face and secured thereto, or formed integrally therewith, usually at its center. This spindle is hollow, being provided with a bore 19$^a$ extending from its bottom up through the disk, the spindle being guided by a spider or equivalent device 20, formed preferably in the bottom portion of the outlet 11, as shown in Fig. 1. The disk or cut-off is further provided with series of apertures or openings 21, usually located near the margin. The body is closed at the top by a cap 22, which is preferably screwed or otherwise attached thereto.

The lower end of the disk-spindle 19 is normally closed by a relief-valve 23, and this relief-valve is located upon and supported by the float-rod 24, provided with the usual float 25 at or near one of its ends. The float-rod is fulcrumed at or near its faucet end upon a hanger 26, for example, secured to the bottom portion of the valve-body and at the extremity of its free end it carries a friction-roller 27, and this roller is in engagement with a weighted lever 28, preferably of angular construction and fulcrumed upon the said hanger 26 over the fulcrum of the float-rod.

The operation of the valve may be stated substantially as follows: The valve is illustrated as closed, and the tank is supposed to be full of water. Upon drawing water from the tank the float will quickly fall when sufficient water has been taken to allow the weight of the float to overcome the holding power of the weighted lever 28, and when the float falls it opens a passage for the water from above the disk 16 through the channel 19$^a$ in the disk-spindle, the water emptying itself into the tank, since the relief-valve will at that time be removed from its seat at the end of the said disk-spindle. With the discharge of the water from the upper portion of the chamber 10 of the body, the pressure on the top of the disk 16 is relieved, and the pressure of the water flowing through the inlet 15 and impinging on the bottom of the disk will force it up from its seat, allowing the water to flow freely into the tank through the large opening or outlet 11.

It will be noticed that when the float is released it falls quickly. At the same time the disk is raised by the pressure of water on its under side. There are thus two movements acting together almost simultaneously to cause the quick opening of the relief-valve 23, the quick movement of the float downward when released, and the quick movement of the disk upward. This additional separating movement is obtained by the spindle 19 extending downward from the movable disk, and the opening of a passage through the spindle, and the placing of a relief-valve at the lower end of the spindle. This double movement is particularly useful in effecting an instantaneous closing of the valve. While the float is down and the valve is open the disk 16 is raised about one-eighth of an inch or less. The float then must rise with the rising water to a point above what would be necessary if the disk were not raised, in order that the relief-valve may meet its seat at the lower end of the spindle; but as soon as the relief-valve has practically closed the outlet in the spindle the water from the inlet 15, flowing up through the disk perforations 21, will begin to accumulate in the upper portion of the body-chamber 10 and exert a downward pressure on the top of the disk, forcing it in a corresponding direction, and instantly the relief-valve is tightly closed, and with its closing the disk will seat itself quickly upon the partition 12, cutting off further supply of water from the inlet to the outlet.

If a sufficient amount of water is drawn from the tank to allow the float to fall enough for the weighted lever to hold it down until released by the upward-lifting power of the rising water, the quick movement of the float when released would effect a quick closing of the valve without the downward movement of the disk and its spindle; but it is seldom that so much water is drawn at once from a house-tank, for which this valve is more particularly intended, and the action of the weighted lever in closing the valve is not often required; but in opening the valve it is very useful, since it holds the float until the water has fallen away from it so far that when it falls it opens the relief-valve sufficiently, in connection with the rising disk, to expose at once the full opening of the main valve.

However small the quantity of water drawn from the tank by leaking faucets, or the smallest of open streams, no water will flow through the float-valve until enough has been drawn to insure the opening of a full stream.

In Fig. 3 I have illustrated a slight modification in the cut-off or disk, and have substituted for the metal or non-pliable disk 16 a flexible diaphragm 29. Consequently the cap 22 is slightly varied in form, and the diaphragm, instead of being moved completely upward, is simply flexed upward by the force of the incoming water sufficiently to raise it from its seat.

Having thus described my invention, I claim as new and desire to secure by Letters Patent—

1. The combination of a valve casing provided with a valve-chamber having an inlet and an outlet, a cut-off controlling the outlet of the valve chamber said cut-off having a spindle projecting from its under side, and being provided with a discharge opening extending through it communicating at its upper end with the said chamber, a float-rod and a valve carried thereby adapted to close the lower end of the discharge-opening in the cut-off, substantially as set forth.

2. In a float valve, a cut-off located within a chamber or valve casing and separating the inlet from the outlet, the said cut-off having openings produced therein outside of its seat, and adapted to close the outlet a water chamber over the cut off communicating with the inlet, whereby water may flow over the top of the cut-off, the said cut-off being further provided with a hollow spindle, the bore of which extends entirely through the cut-off, a relief valve normally closing the lower end of the said spindle, and a float operating said valve, substantially as shown and described.

3. In a float valve, a float and its rod, and a weighted lever having an inclined face bearing against the said rod at its free end, as and for the purpose set forth.

4. In a float valve, the combination, with the float rod and float, and the fulcrum for the float located between the ends of the float rod, of a weighted lever pivoted near the fulcrum of the rod and bearing against its free end, the weighted portion of the lever exerting constant downward pressure on the said float rod, as and for the purpose specified.

5. In a float valve, the combination, with a casing, provided with an inlet and an outlet, a cut-off normally closing communication between the inlet and outlet, provided with perforations communicating with the inlet and admitting water to the upper portion of the cut-off, the said cut-off being further provided with a hollow spindle the bore of which extends through the cut-off, of a float, a rod carrying said float and fulcrumed upon a support, a valve normally closing the lower end of the spindle and supported by the float rod, and a weighted lever bearing upon the fulcrum end of said float rod, as set forth.

JOSEPH W. CHAMBERLAIN.

Witnesses:
THOMAS W. VOSE,
JAMES ADAMS.